July 18, 1950  E. NIEDERER, JR., ET AL  2,515,252
COMPOSITE BY-PASS VALVE AND
FLUID TRANSITIVE APPLIANCE
Filed Jan. 2, 1945  8 Sheets-Sheet 3

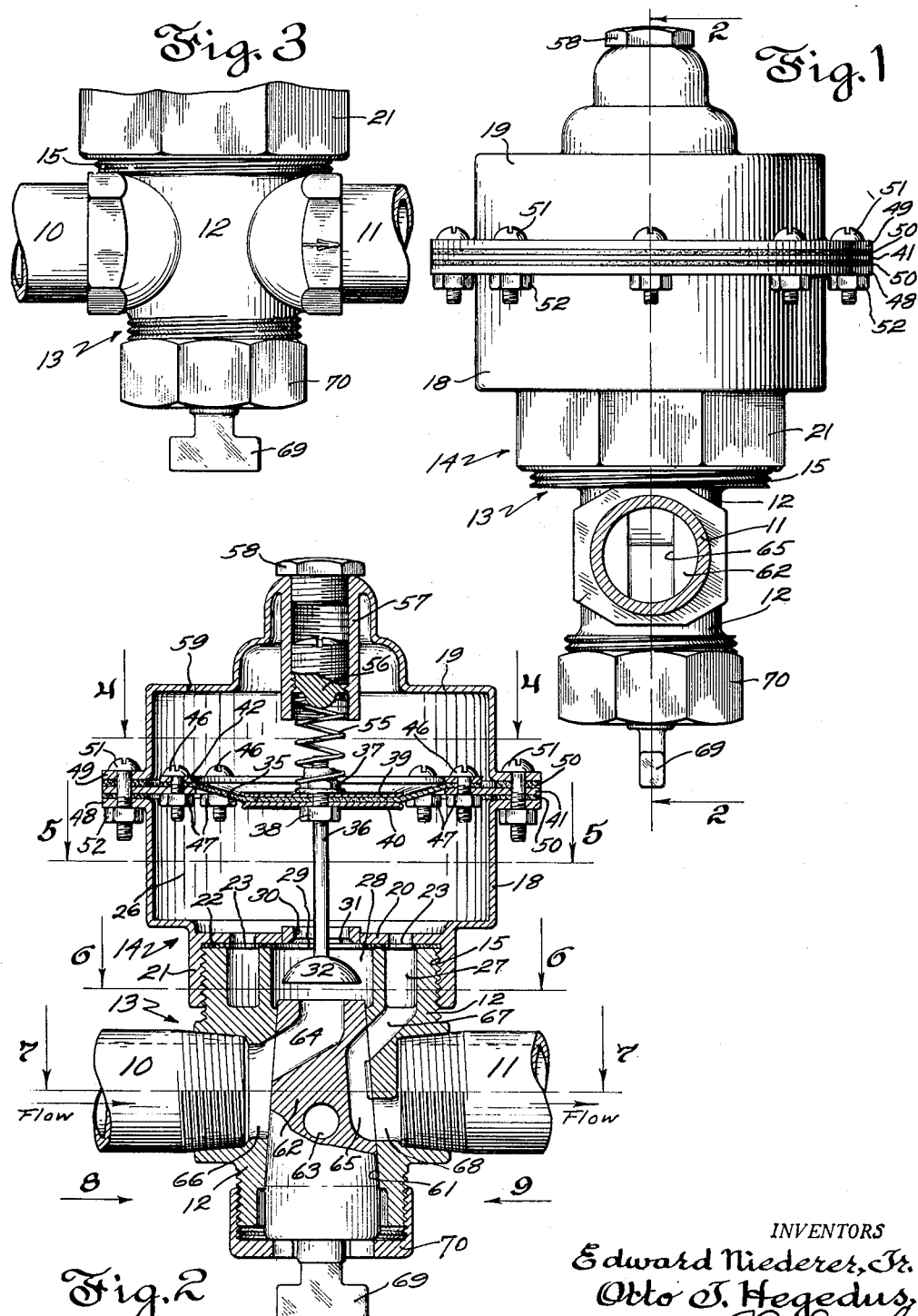

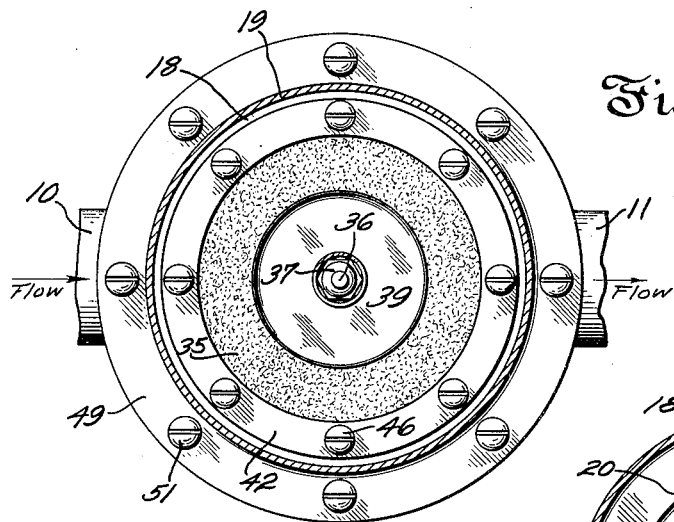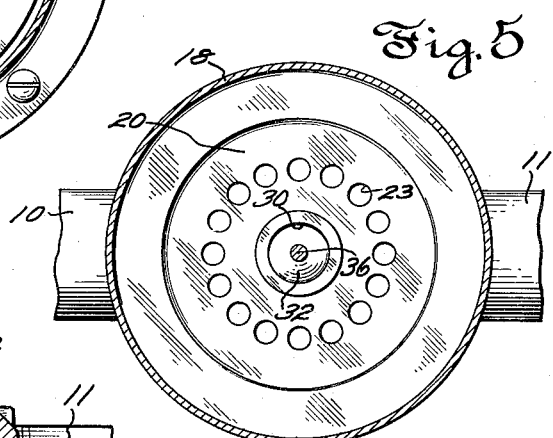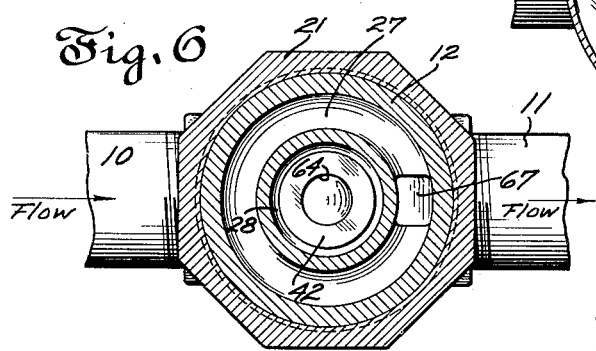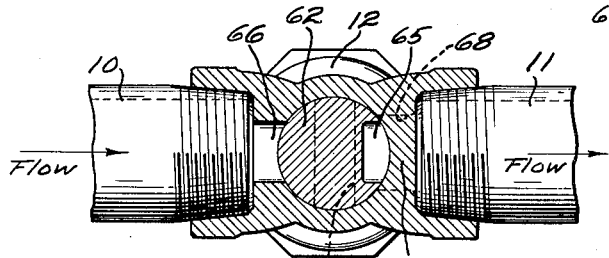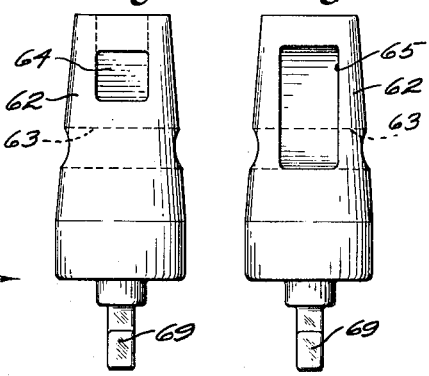

INVENTORS
Edward Niederer, Jr.
Otto J. Hegedus
BY
ATTORNEY

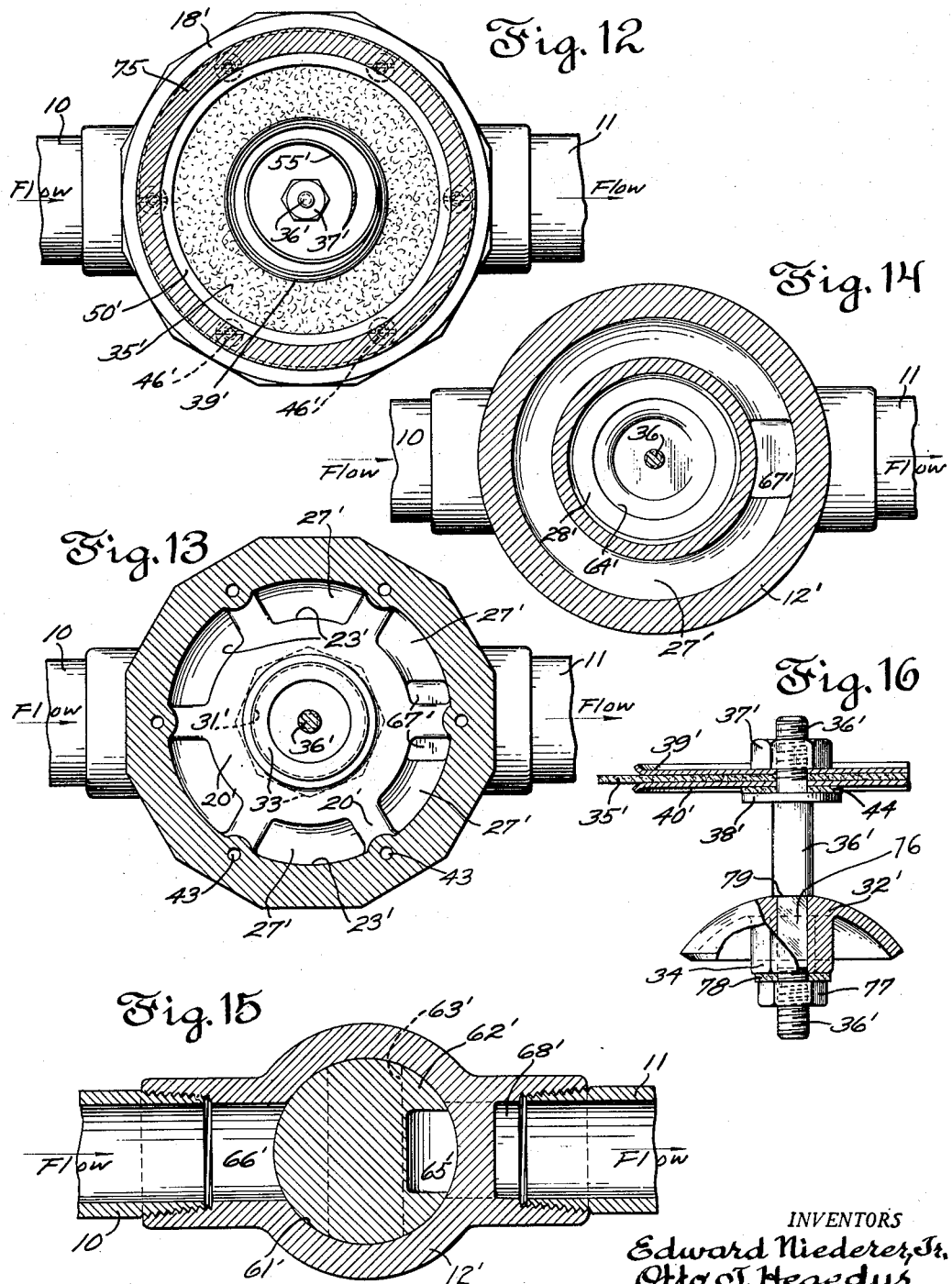

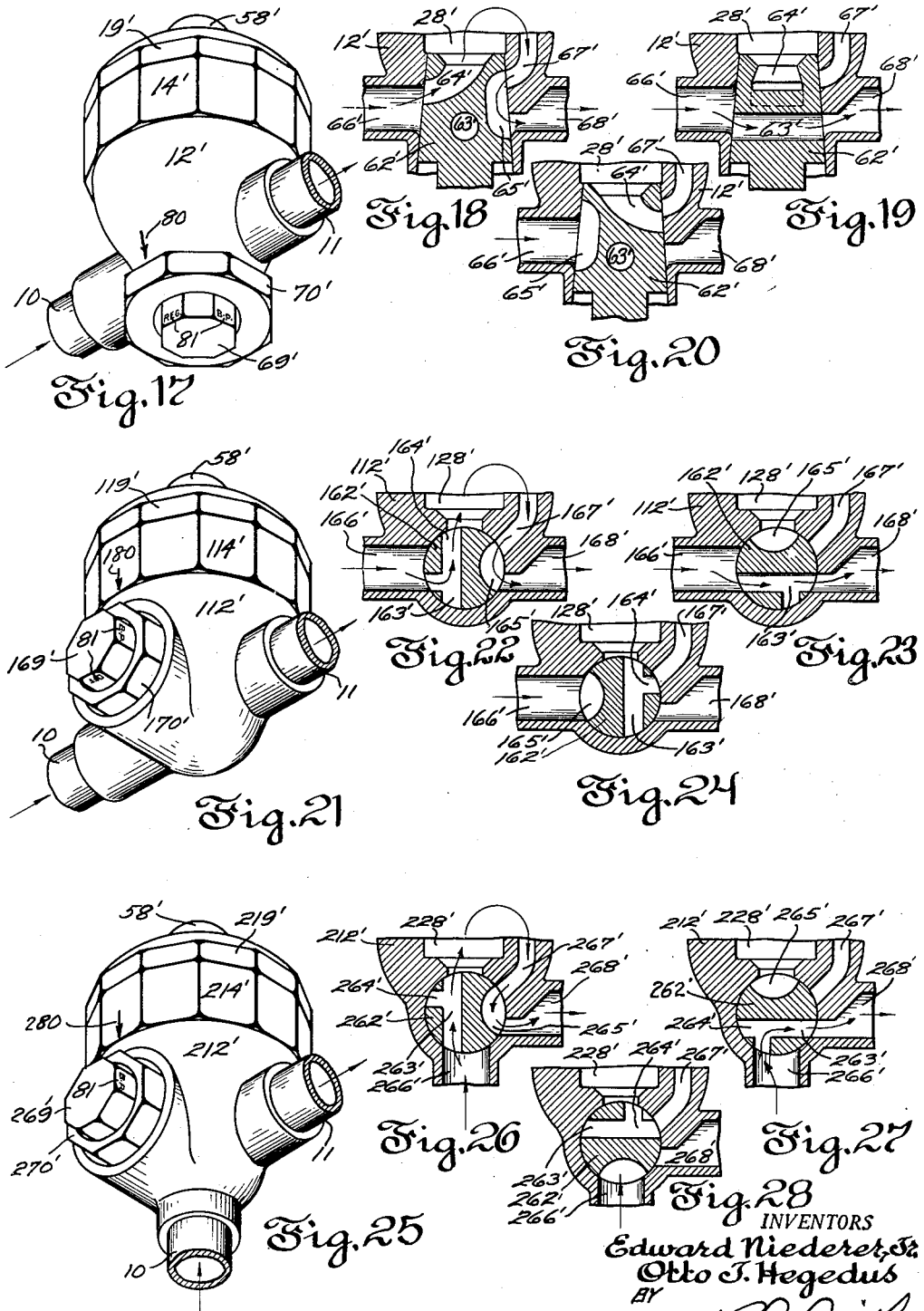

July 18, 1950 E. NIEDERER, JR., ET AL 2,515,252
COMPOSITE BY-PASS VALVE AND
FLUID TRANSITIVE APPLIANCE
Filed Jan. 2, 1945 8 Sheets-Sheet 6

INVENTORS
Edward Niederer, Jr.
Otto J. Hegedus
BY
ATTORNEY

INVENTORS
Edward Niederer, Jr.
Otto J. Hegedus
BY
ATTORNEY

July 18, 1950    E. NIEDERER, JR., ET AL    2,515,252
COMPOSITE BY-PASS VALVE AND
FLUID TRANSITIVE APPLIANCE
Filed Jan. 2, 1945      8 Sheets-Sheet 8
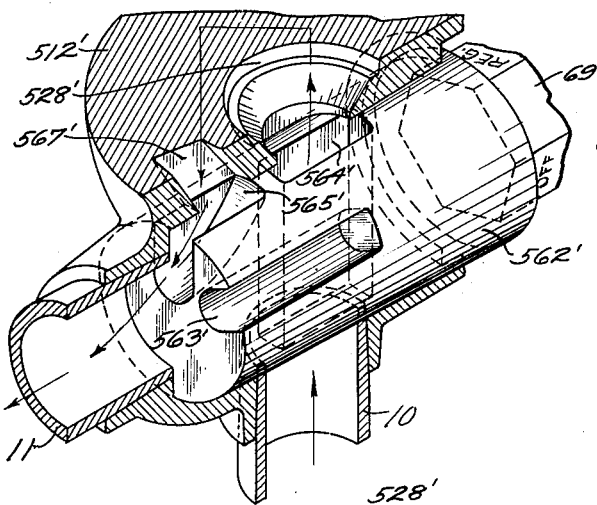
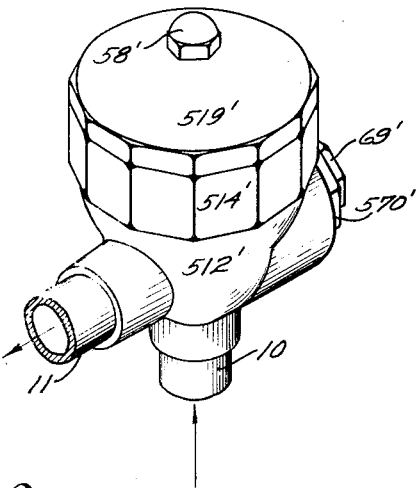
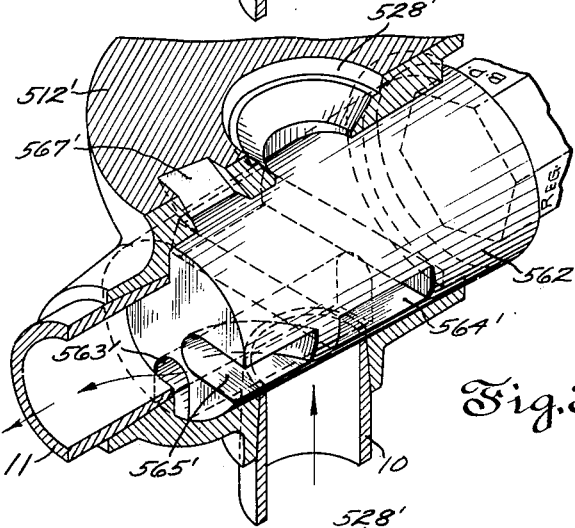
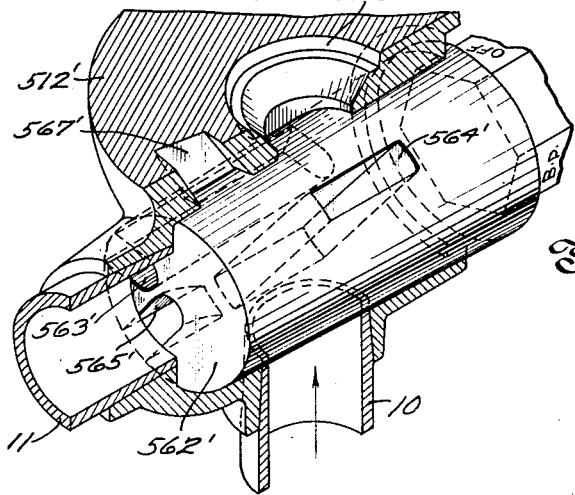
INVENTORS
Edward Niederer, Jr.
Otto J. Hegedus
BY
ATTORNEY Patented July 18, 1950

2,515,252

UNITED STATES PATENT OFFICE 2,515,252

COMPOSITE BY-PASS VALVE AND FLUID TRANSITIVE APPLIANCE

Edward Niederer, Jr., Bridgeport, and Otto J. Hegedus, Fairfield, Conn.

Application January 2, 1945, Serial No. 571,034

14 Claims. (Cl. 50—23)

This invention relates to appliances attachable in a pipe line for conditioning or being conditioned by a fluid that flows in the line and through the appliance. Certain features of the improvements are of particular advantage in automatic gas pressure regulating appliances such as the regulators commonly installed in house lines to protect gas burners fed by the line from fluctuations of gas pressure arising in the mains or arising from pulsating operation of the meter through which the house line is fed.

The present day practice in installing and servicing gas pressure regulators is to provide the body or casing of the regulator with an inlet and an outlet usually threaded or otherwise adapted for piping connection so that the regulator can be installed in a house line in a manner to fill a gap or a break in the piping. This manner of installation necessitates breaking the continuity of the conduit when for any reason the regulator must be removed from the pipe line for inspection or repairs. This incurs dangerous and inconvenient interruption of the gas supply service unless some new appliance is temporarily installed in place of the removed regulator or unless a temporary pipe coupling is installed to bridge the gap left open in the pipe line. Either of these practices is time consuming and inefficient and makes servicing of such equipment costly and burdensome.

A general object of the present invention is to make unnecessary the replacing of a gas pressure regulator by any form of temporary equipment when the regulator, or other fluid transitive appliance, must be taken from the line and removed to a service station for inspection or repair.

A related object is to avoid any interruption of the house service fed by the pipe line when a gas pressure regulator or other fluid transitive appliance is opened for inspection or repair without removing such regulator from the pipe line.

A further object is operatively to associate in a unitary structure adapted for installation in a pipe line, both a gas pressure regulator (or any other kind of fluid reactive device) and a manually settable valve serving when set in selectively different positions either to feed the pipe line conducted flow of fluid through the regulator or to shunt such flow of fluid past the regulator without permitting it to enter the regulator.

A further object is to provide the above mentioned manually settable or distributor valve with a still different set position to which it optionally may be turned and thereby cut-off all flow of gas or other fluid from the supply pipe to both the appliance and the house line, as well as all backward escape of gas out of the house line.

A further object is to make a gas pressure regulator or other fluid reactive section of the improved appliance readily removable from a distributor valve containing section thereof so that the section carrying the distributor valve can remain installed in the pipe line while the section carrying the pressure regulator is removed for inspection or repair. As will be clear from objects stated in the foregoing the distributor valve is desired to be manually so settable on such occasion that escape of gas from the pipe line into the room will be precluded while the pressure regulator section of the appliance is absent.

A further object is to provide an improved gas pressure actuated diaphragm and means for its peripheral support in the form of a composite unitary structure or sub-assembly thereby to make it contributory to the other foregoing objectives. The present improvements also aim to make such improved diaphragm more easily removed from and replaced in the appliance as a unit for convenient inspection and repair, and provide better protection for increasing durability of the diaphragm when installed.

It is also an object to provide the diaphragm with a pressure operated valve disc capable of being assembled and disassembled in a specialized manner particularly suited to the novel structural organization of the improved regulator.

A still further object is to equip the improved appliance with a valve having plural distributing ports adapted to perform the flow governing functions above described, and specifically to incorporate such ports in a rotary valve plug which may be constructed to have its axis of rotation in various angular relationships to the inlet pipe and the outlet pipe while said pipes may also bear various angular relationships to each other.

The foregoing and other objectives are referred to in the following description of preferred embodiments of the invention in which description reference is had to the accompanying drawings wherein:

Fig. 1 is a view in elevation showing the outside of one form of a fluid transitive appliance incorporating the present invention.

Fig. 2 is a view taken mostly in section on the plane 2—2 in Fig. 1 looking in the direction of the arrows.

Fig. 3 is a view looking from the left at the lower portion of the structure in Fig. 1.

Fig. 4 is a plan view taken in section on the plane 4—4 in Fig. 2.

Fig. 5 is a plan view taken in section on plane 5—5 in Fig. 2.

Fig. 6 is a plan view taken in section on the plane 6—6 in Fig. 2.

Fig. 7 is a plan view taken partially in section on the plane 7—7 in Fig. 2.

Fig. 8 shows the valve plug detached viewed from the left in Fig. 2.

Fig. 9 shows the same detached valve plug viewed from the right in Fig. 2.

Fig. 12 is a plan view taken in section on the plane 12—12 in Fig. 11.

Fig. 13 is a plan view taken in section on the plane 13—13 in Fig. 11.

Fig. 14 is a plan view taken in section on the plane 14—14 in Fig. 11.

Fig. 15 is a plan view taken in section on the plane 15—15 in Fig. 11.

Fig. 16 is an enlarged fragmentary view of the diaphragm and valve disc operated thereby taken partly in section on the vertical plane 16—16 in Fig. 11.

Fig. 17 is an isometric view looking slantingly upward at the composite by-pass valve and gas regulator shown in Fig. 10.

Figs. 18, 19 and 20 are views in reduced size taken in section on an axial plane of the valve plug showing it turned to positions for respectively, feeding gas through the regulator, by-passing the regulator, and cutting off escape of gas both from the inlet and outlet piping connections of the valve body.

Fig. 21 is a view similar to view 17 except that the axis of the valve plug is perpendicular to the vertical axis of the regulator.

Figs. 22, 23 and 24, corresponding respectively to Figs. 18, 19 and 20, show modified ports in the valve plug positioned for respectively, feeding gas through the regulator, by-passing the regulator, and cutting off all escape of gas from both the inlet and outlet piping connections of the valve body.

Fig. 25 is a view similar to Fig. 21 except that the inlet pipe is in line with the vertical axis of the regulator.

Figs. 26, 27 and 28 correspond respectively with Figs. 22, 23 and 24 and show the ports of the valve plug turned to positions for respectively, passing gas through the regulator, by-passing the regulator, and cutting off escape of gas from both the inlet and outlet piping connections of the valve body.

Figure 30:
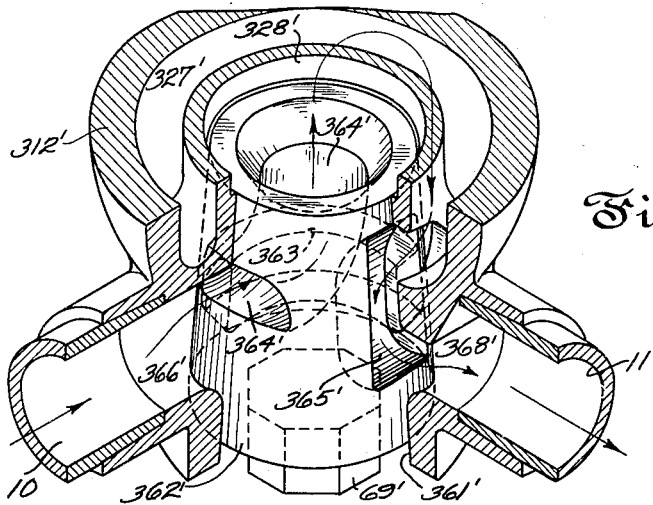
Figure 29:
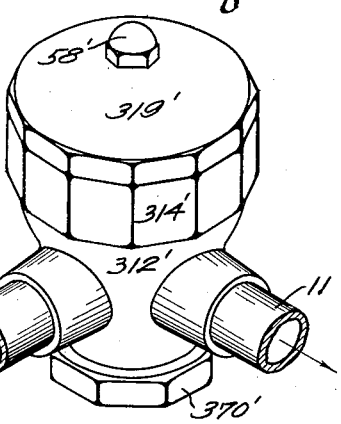
Figure 31:
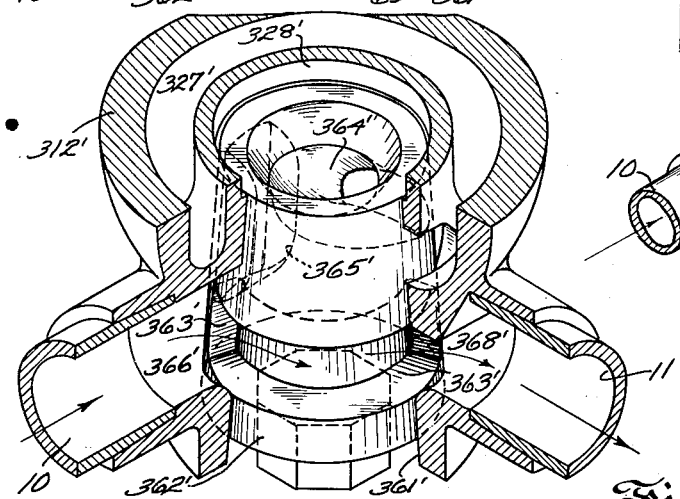
Figure 32:
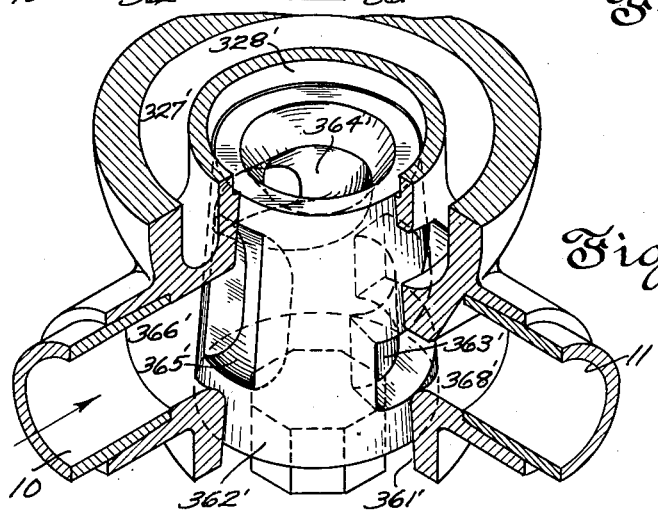

Fig. 29 is a view similar to Fig. 17 except that the inlet and outlet pipes are perpendicular to each other. Figs. 30, 31 and 32 are perspective cut-away or sectional views corresponding respectively to Figs. 18, 19 and 20 showing modified ports in the valve plug turned to positions for respectively, passing gas through the regulator, by-passing the regulator, and preventing the escape of gas from both the inlet and outlet piping connections of the valve body.

Figure 33:
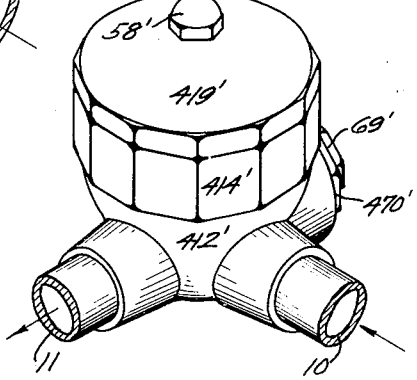

Fig. 33 is a view similar to Fig. 29 except that the axis of the valve plug is aligned straightaway with the outlet pipe.

Figure 34:
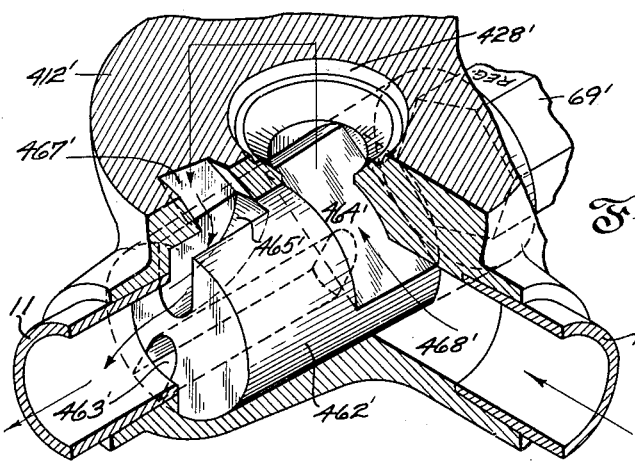
Figure 35:
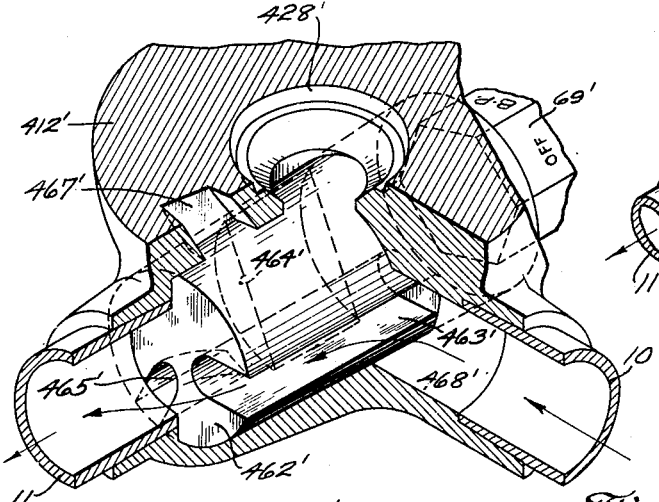
Figure 36:
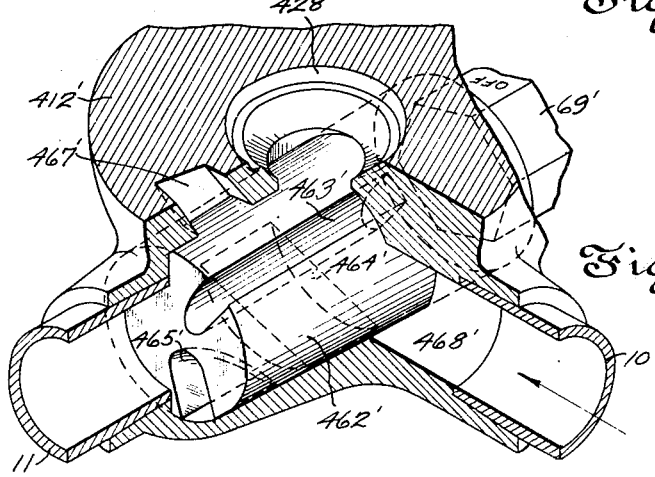

Figs. 34, 35 and 36 are perspective cut-away or sectional views showing modified ports in the valve plug turned to positions for respectively, passing gas through the regulator, by-passing the regulator, and cutting off all escape of gas from both the inlet and outlet piping connections of the valve body.

Fig. 37 is a view corresponding to Fig. 33 except that the inlet pipe is in alignment with the vertical axis of the regulator.

Figs. 38, 39 and 40 are perspective cut-away or sectional views showing modified ports in the valve plug turned to positions for respectively passing gas through the regulator, by-passing the regulator, and blocking the escape of gas from both the inlet and outlet piping connections of the valve body.

All arrows not otherwise designated throughout the figures of the drawings indicate the direction of flow of gas or other fluid that is involved in the operation of our improved composite by-pass valve and pressure regulator.

In the form of the invention shown in Figs. 1 to 9, inclusive, the inlet pipe 10 may run from the supply main or from an ordinary residental gas meter (not shown), and the outlet pipe 11 may carry gas to some gas burning household appliance such as a cooking range, water heater, house heater or the like (not shown), wherein the gas supplied through the house pipe line 10—11 is consumed. Each of pipes 10 and 11 is shown to be rigid and in supporting threaded engagement with the body 12 of a distributor valve which valve is indicated as a whole by 13 and comprises the lower section of a unitary gas conditioning appliance or automatic gas pressure regulator embodying the present invention. A second or superimposed section of said appliance is designated 14 as a whole and serves as a bonnet for valve 13 removable from the top portion of valve body 12 to which it preferably is coupled or joined by threaded engagement at 15. Less convenient kinds of detachment permitting coupling means might be employed such as mating flanges on both the valve and regulator sections penetrated by removable bolts for holding them together, like those shown in Fig. 2 and hereinafter described for fastening together separable sections of the regulator housing itself.

Regulator section 14 is comprised of a lower cup-shaped casing 18 and an upper inverted cup-shaped housing cap 19. Casing 18 has a floor wall 20 at the junction of its upper cylindrical portion and its lower, hexagonal, internally threaded portion 21 which latter is suited to be engaged by a large wrench for screwing the regulator section 14 on and off from the valve section 13. To insure gas tightness at the joint between floor wall 20 and the top surface of valve body 12 a soft gasket 22 is interposed. Both this gasket and the floor wall 20 are perforated by a circular series of registering apertures 23 giving passage for the gas between the regulator chamber 26 and an annular channel 27 sunk from the top surface of valve body 12. Centrally of the annular channel 27 in valve body 12 there is a cavity or well 28, which is isolated from channel 27 by the gasket 22, and a smaller registering aperture 30 in the floor wall 20. The latter aperture is bordered by a nicely ground valve seat 31 toward and away from which the valve disc 32 is automatically moved in accordance with changes in the pressure of the gas or other fluid present in regulator chamber 26.

The up and down movements of valve disc 32 are effected by diaphragm 35. To a central portion of this diaphragm the valve disc 32 is attached by a depending valve stem 36 whose upper threaded end receives the top and bottom clamp nuts 37 and 38 which squeeze the top and bottom disc washers 39 and 40 firmly against opposite surfaces of the central section of diaphragm 35.

Diaphragm 35 may be of any suitable material such as specially treated leather. According to the present improvements its peripheral margin is sandwiched permanently between a mounting plate annulus 41 and a stiff clamp ring 42 held together by means of a series of screws 46 and nuts 47. The mounting annulus 41 is sufficiently larger in girth than the clamp ring 42 to be received and firmly sandwiched between a coupling flange 48 on regulator casing 18 and a mating flange 49 on housing cap 19 with the assistance of gas tight gasket washers 50, 50, fastening screws 51, and nuts 52. Thus by the removal of screws 51 and housing cap 19, the mounting annulus 41 is freed to permit diaphragm 35 and its integrally associated parts to be separated as a unit from regulator casing 18 and thereafter to be removed completely from such casing whenever it is detached from the valve stem 36 by unscrewing nut 37 from stem 36. In keeping with conventional gas regulator construction, a spring coil 55 is under axial compression between disc washer 39 and a plug stud 56 which has threaded engagement with a vertically disposed tubular bearing 57 fixed in the top of housing cap 19 and opening upward therethrough to give access to a screw driver for turning stud 56 to different vertical positions thus adjusting tension in spring 55. A screw cap 58 covers the top of the opening through bearing 57 and keeps out dirt. The customary vent to atmosphere from the space above diaphragm 35 in the housing cap 19 is afforded through a small hole 59 in the wall of the housing cap.

Figs. 1, 2 and 3 show one of a number of possible varying dispositions in angular relationships of the inlet and outlet pipe 10 and 11 to each other as well as to the vertical axis of the regulator appliance. In these particular figures the inlet and outlet pipes are aligned straightaway and are at right angles to the vertical axis of the regulator appliance while the ported rotary plug 62 has its axis of rotation coincident with the vertical axis of the appliance. In keeping with objectives of the invention, plug 62 turns in a gas-tight conical seat 61 in the valve body 12 and contains three relatively isolated ports consisting of a straight crosswise port 63, an elbow port 64, and a flute port 65. Valve body 12 is provided with a passageway 68 communicating with the outlet pipe 11. Valve plug 62 is provided with a T-handle 69 extending outside the valve body for manual turning and is fastened against accidental turning in whatever position it is manually set by the upward axial pressure thereagainst of a lock cap 70 having threaded engagement with the valve body.

Before proceeding to a description of modified constructions, the operation of the form of the invention illustrated in Figs. 1 to 9, inclusive, may be explained as follows: In service, valve plug 62 normally remains set in its rotary position of Fig. 2 whereby gas arriving through inlet pipe 10 is led through passageway 66, plug port 64, well 28, apertures 29, 30, (in proportion to the extent of opening of automatic regulator valve 31—32) thus into regulator chamber 26 and back down through apertures 23, channel 27, passageway 67, plug port 65, passageway 68 and outlet pipe 11. In usual manner, excessive gas pressure in regulator chamber 26 will flex diaphragm 35 upward so that stem 36 will lift valve disc 32 thereby automatically to reduce the passage for gas between same and the valve seat 31. This causes less and less gas to flow into chamber 26 until the gas pressure therein becomes normal again. As this occurs, spring 55 assists in automatic reopening of valve 32 to such point as will keep gas pressure in chamber 26 at a substantially constant pressure.

When now it is desired or necessary to gain access to the inside working parts of the regulator 14, it is not necessary according to the present invention to separate the entire appliance body from its threaded connection to pipes 10 and 11 for removing the regulator from the pipe line. Instead, the locking cap nut 70 is loosened sufficiently to free valve plug 62 so that it may be turned by means of its T-handle 69 to either of two different positions represented respectively in Figs. 19 and 20 after which cap nut 70 is retightened to hold the valve plug in such different set position.

In both of said different rotary positions of the valve plug flow of gas to and from both the channel 27 and the well 28 is completely cut off. In the position of valve plug shown in Fig. 19 gas is permitted to flow from inlet pipe 10 through passageway 66, valve port 63, direct to passageway 68 and outlet pipe 11. This continues uninterrupted flow of gas, at pressure which now however is unregulated, through the pipe line. Thus the flow of gas bypasses regulator chamber 26 without entering the same.

In Fig. 20 both passageway 66 and passageway 68 are blind-ended by unported surface portions of valve plug 62 so that gas is not only prevented from traveling beyond passageway 66 but is also prevented from escaping backward through passageway 68 out of the house line pipe 11. This avoids annoyance from disagreeable odors that would otherwise result from vagrant escape of gas.

In the positions of the valve plug in either Figs. 19 or 20 a workman is free to unscrew the regulator section 14 from the valve body 12 and take it away to a service shop for repairs. Meanwhile no gas will escape from the pipe line and it is optional whether gas from inlet pipe 10 shall flow on through or be cut off entirely from the outlet pipe 11. Thus in servicing, the pipe line need never be broken as a conduit in a way to require the temporary insertion of coupling pipe or of some substitute appliance in order to prevent interruption of service in the house line.

Should it be desired to remove diaphragm 35 alone, instead of unscrewing the regulator section 14 as a whole from the valve body 12, screws 51 may be removed permitting the housing cap 19 to separate from the lower casing 18 of the regulator section. Then the diaphragm can be separated from valve stem 36 by removing the top nut 37 from the valve stem. With the valve disc 32 still left in well 28, housing cap 19 may then be temporarily restored and the diaphragm taken away and repaired or replaced at convenience by permanent installation of another diaphragm.

After inspection or repair of the regulator locking cap nut 70 will again be loosened and the valve plug 62 restored to its position shown in Fig. 2 thus again establishing the regulator operatively in the pipe line so that it will perform its function of regulating pressure of the gas flowing therethrough. Locking cap nut 70 will again be screwed up tightly to hold the valve plug against accidental displacement from this normal service position.

In Figs. 10 to 16, inclusive, the same angular relationship of inlet pipe, outlet pipe, and valve plug axis is shown in a modified form of automatic gas pressure regulator incorporating improved features both similar and additional to those illustrated in Figs. 1 to 9, inclusive.

Elements corresponding in function to those hereinbefore described are designated in Figs. 10 to 16, inclusive, by corresponding reference numerals primed, so that it becomes necessary only to describe in detail those features of construction and arrangement in the modification which differ functionally from the construction illustrated in Figs. 1 to 9, inclusive. These differences reside most largely in the following features: modified construction for separably joining or coupling together the modified lower casing 18' and the housing cap 19' in a manner to protect, instead of exposing, the outside edge of the diaphragm 35', and modified assemblage construction of the diaphragm operated pressure regulating valve 32' including modified construction of its valve seat 31'. In the modified form of lower casing 18' arcuate apertures 23' provide more spacious gas communication between regulator chamber 26' and the annular well 27' than do the holes 23 in Fig. 5.

To accomplish the objective of protecting the usually exposed outermost edge of a fluid pressure responsive diaphragm against drying out, absorbing deleterious fumes, etc., the lower casing 18 is provided with a threaded counterbore 74 into which screws a threaded rabbet 75 formed on the housing cap 19'. Thus the peripheral margin of diaphragm 35' may be sandwiched between rigid clamp ring 42' and a rigid clamp ring 41', of similar outside diameter, held together by a series of screws 46' which have threaded engagement with tapped holes in the bottom clamp ring 41' and project downward therebeyond to be received like dowels in a circular series of blind-ended clearance holes 43 sunk from the planar annular surface of counterbore 74. Thus when soft gasket washers, as 50', are placed above and below clamp rings 41' and 42' the marginal portion of the composite diaphragm unit may be clamped firmly downward against the bottom of counterbore 74 by the pressure of rabbet 75 thereon when the housing cap 19' is screwed tightly down, the engagement of screws 46' with the dowel holes 43 preventing the diaphragm from being turned by the rotary screwing down movement of the housing cap and the gasket washers 50' making a gas tight seal preventing upward leakage of gas outward of regulator chamber 26'.

To make it possible to remove or replace the valve seat 31' the latter is formed on a separable bushing 33 which has threaded engagement with a central aperture in the floor wall 20' of the lower casing 18' of the regulator. The bottom enlarged head of this bushing has external flats accessible for applying a wrench when casing 18' is removed from the valve body 12'.

To make it unnecessary to remove the valve stem 36' from diaphragm 35' when it is desired to take the latter out of or away from the appliance, the valve disc 32' is made removable from stem 36' by giving a flat sided hole in the former a snug slide fit on a flatted portion of shank 76 of the latter. A nut 77, having threaded engagement with the lower end of shank 76, through the medium of a gas tight seal washer 78 thrusts valve disc 32' firmly upward against a thrust shoulder 79 on stem 36' at the top end of shank 76 whereby the valve disc is fixed in readily removable relation to stem 36'. Valve disc 32' is held from turning by applying a wrench to its flat sided hub 34 while nut 77 is being tightened or loosened. A collar 38' seated against another shoulder on stem 36' takes the place of the bottom clamp nut 38 of Figs. 1 to 9 and the stem 36' is removable from diaphragm 35' when desired by removing the top clamp nut 37' from the top threaded end of the stem. Gas tight seal around stem 36' is afforded by a soft gasket washer 44 squeezed between disc washer 40' and collar 38'.

The lower casing 18' and housing cap 19' are advantageously made of cast metal while portions of the corresponding parts 18 and 19 are suited to production from drawn sheet metal. In Figs. 10 to 16, the screw cap 58' contains the vent holes 59' and threaded stud 56' has a long vent hole 60 from end to end through which the space above diaphragm 35' is given communication with ambient air. The bottom end of stud 56' takes the thrust of and adjustably regulates the axial tension in valve opening spring 55'.

Figs. 17 to 40 inclusive, illustrate devious arrangements of the three ports in the rotary plug of the by-pass or distributing valve suited to correspondingly different angular relationships of inlet pipe to outlet pipe to axis of the valve plug.

Figure 10:
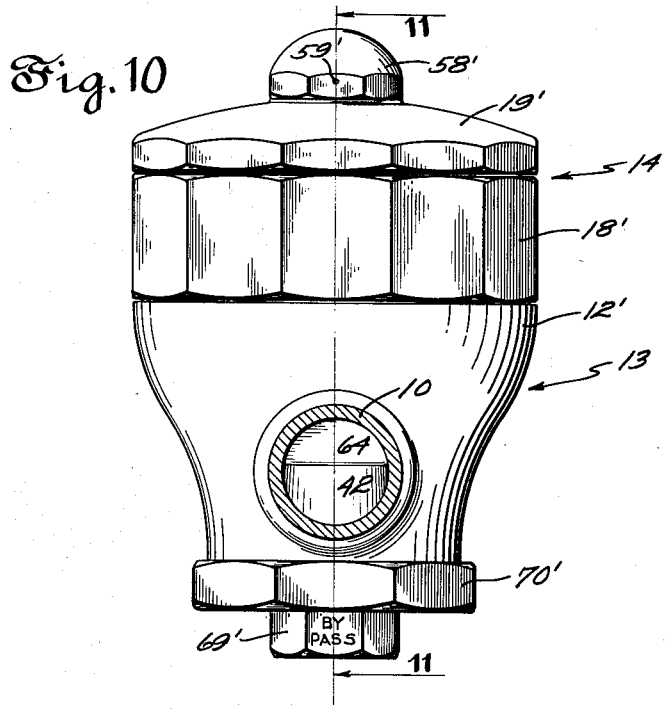
Fig. 10 is a view similar to Fig. 1 showing a modified form of fluid transitive appliance incorporating similar and additional improvements.
Figure 11:
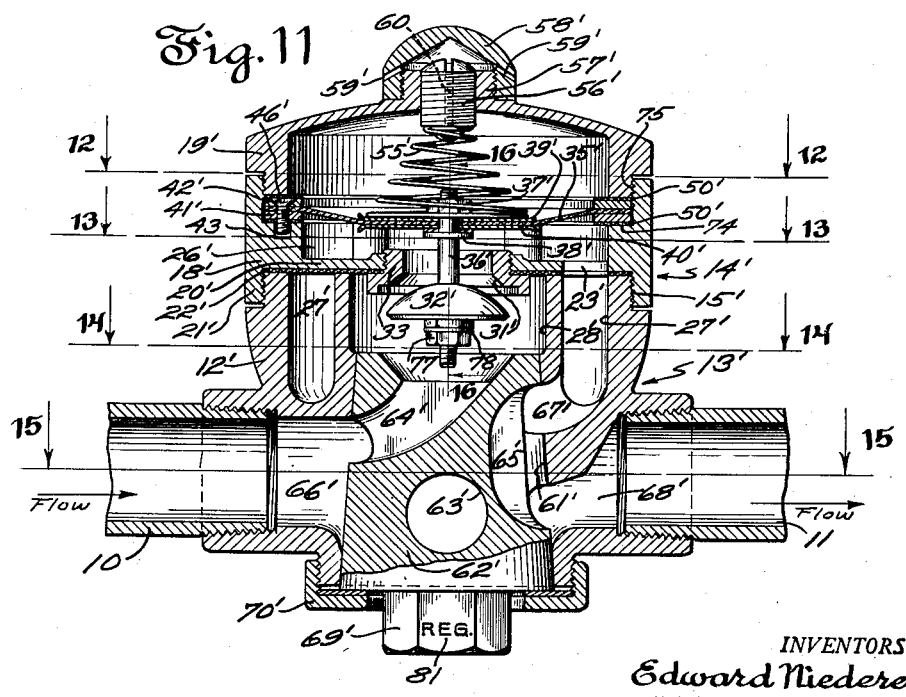
Fig. 11 is a view taken in section on the vertical plane 11—11 in Fig. 10 looking in the direction of the arrows.

In Figs. 17 to 20, inclusive, the ports of the valve plug are numbered as in Fig. 11 and the corresponding function of the modified forms of these valve plug ports in various figures of the drawings in which they appear will clearly be understood from the system of reference numerals employed. In this system the same final two digits in the reference numeral are used to designate the same or corresponding valve plug port or valve body passageway. The one-hundred series of such reference numerals are applied to Figs. 22 to 24. The two-hundred series of such reference numerals are applied to Figs. 26 to 28. The three-hundred such series of numerals are applied to Figs. 30 to 32. The four-hundred such series of numerals are applied to Figs. 34 to 36. The five-hundred such series of numerals are applied to Figs. 38 to 40. Thus by reading said different hundred series of numerals in place of the reference numerals 28', 63', 64', 65', 66', and 67' in the foregoing description of operation having reference to Figs. 11, 18, 19, and 20 the operation and course of gas flow through all the various body passageways and valve ports in Figs. 21 to 40, inclusive, will be apparent.

It may be noted that an index arrow 80 may be embossed or marked at various convenient locations on the outside surface of the valve body in various modified constructions, such arrow being directed toward flats on the valve adjusting handle 69' which flats may be marked as indicated at 81 to show whether the rotary position of the valve plug of the by-pass or distributor valve is such as to feed gas through the regulator or to by-pass the regulator, or to cut off all escape of gas from both the inlet and outlet piping connections to the valve body.

Whereas a variety of constructions and relationships of valve plug ports are herein illustrated to aid in comprehending the novel principles underlying the present invention in its broader aspects, it will be understood that the appended claims are directed to and intended to cover not only the particular shapes and arrangements of parts herein disclosed but all substitutes and equivalents thereof which are fairly embraced within the more general meaning of the language of the claims.

We claim:

1. A composite automatic gas pressure regulator and manually operable regulator isolating valve, including in a unitary sectional structure, a three-position valve comprising one section of said structure equipped to be insertable detachably in a pipe line and having a neck portion with gas passageways opening therethrough, and an automatic gas pressure regulator comprising another section of said unitary structure equipped to be detachably mounted as a valve bonnet on said neck portion of said three position valve having fluid communication with said passageways, said passageways being so cooperatively related to said valve that in one position of the latter said regulator is isolated completely from all fluid communication with said pipe line.

2. A fluid transitive appliance embodying in a unitary structure adapted for detachable insertion in a pipe line, at least one fluid utilizing chamber, and a selective by-passing and shut-off valve shiftable between at least three different positions constructed and arranged in one of said positions to direct fluid flowing in said pipe line through only said fluid utilizing chamber, in a different one of said positions to direct fluid flowing in said pipe line only externally past said chamber, and in a still different one of said positions to shut-off all flow of fluid through both said pipe line and said chamber, whereby in said still different position of the valve said chamber may be removed from said valve without permitting escape of fluid from said pipe line.

3. A fluid transitive appliance embodying a hollow structure having an inlet and an outlet adapted for connection of said structure as a unit in a pipe line, partitions in said structure dividing the hollow interior thereof into fluid conducting passageways leading from said inlet to said outlet and also affording a fluid utilizing chamber, and a single valve including movable ports shiftable into and out of three different communicating relationships to said passageways, one of said relationships passing fluid from said inlet through said chamber to said outlet, another of said relationships isolating said chamber from fluid communication with both said inlet and said outlet and simultaneously passing fluid directly from said inlet to said outlet, and another of said relationships isolating said chamber from fluid communication with both said inlet and said outlet and simultaneously isolating said inlet from said outlet.

4. A fluid transitive appliance embodying a hollow sectional structure comprising readily separable base and head sections, an inlet and outlet in said base section of said structure adapted for connection in a pipe line, partitions in said structure dividing the composite hollow interior thereof into optionally usable fluid conducting passageways one of which leads directly from said unit to said outlet, a fluid utilizing chamber in the other said passageway located in said head section, automatic fluid regulating devices in said chamber removable therewith from said base section, and a single valve within said base section including movable ports shiftable into and out of three different communicating relationships to said passageways, one of said relationships passing fluid from said inlet through said chamber to said outlet, another of said relationships isolating said pressure regulating devices from fluid communication with both said inlet and said outlet and simultaneously passing fluid directly from said inlet to said outlet, and another of said relationships isolating said pressure regulating devices from fluid communication with both said inlet and said outlet and simultaneously isolating said inlet from said outlet.

5. A composite automatic fluid pressure regulator and manually settable regulator isolating valve, embodying a composite unitary appliance structure having three separable housing sections comprising, a base section equipped to be detachably connected in a pipe line and having an outwardly opening tubular neck, a barrel section detachably mounted on the open end of said tubular neck in edgewise peripheral conformity therewith, a modulating valve and a pressure responsive diaphragm connected to operate said modulating valve located in said barrel section, said intermediate section presenting outwardly away from said base section an accessible annular seat marginally supporting said diaphragm, and a cover section comprising a hollow dome detachably fastened to said barrel section in edgewise peripheral conformity therewith.

6. A fluid transitive appliance having a fluid utilizing chamber and an inlet and an outlet adapted for connection of said structure as a unit in a pipe line, and comprising a single valve having a stationary hollow body with an outwardly disposed face containing an elongated bearing bore and partitions dividing the hollow interior of said body into at least four relatively isolated passageways two of which open through said body face and communicate separately with the said fluid utilizing chamber and two others of which communicate respectively with said inlet and said outlet of the appliance, said valve also including a valve plug rotatably seated in said bearing bore and having ports, said plug carrying the said ports to at least three different positions and arranged in relation to said passageways so that in one of said positions fluid is directed through at least one of said ports from one of said line pipes through said chamber via said chamber communicating passageways to the other line pipe and so that in another of said positions fluid is by-passed around said chamber through at least one of said ports directly from one to the other of said line pipes and so that in a still different one of said positions said two pipe line communicating passageways are blind ended by said valve plug in a manner to preclude escape of gas simultaneously from both said inlet and outlet.

7. A composite automatic fluid pressure regulator and manually settable regulator isolating valve, embodying a composite unitary appliance structure having three separable housing sections comprising, a base section equipped to be detachably connected in a pipe line and having an outwardly opening tubular neck, a barrel section having screw threaded engagement with said base section and thereby detachably mounted on the open end of said tubular neck in edgewise peripheral conformity therewith, a modulating valve and a pressure responsive diaphragm connected to operate said modulating valve located in said barrel section, said intermediate section presenting outwardly away from said base section an accessible annular seat marginally supporting said diaphragm, and a cover section comprising a hollow dome having screw threaded engagement with said barrel section and thereby detachably fastened thereto in edgewise peripheral conformity therewith.

8. A composite automatic gas pressure regulator and manually operable regulator isolating valve, including in a unitary sectional structure, a three-position valve comprising one section of said structure equipped to be insertable detachably in a pipe line and having a neck portion with gas passageways opening therethrough, and an automatic gas pressure regulator comprising another section of said unitary structure equipped to be detachably mounted as a valve bonnet on said neck portion of said three-position valve having gas passageways registering with said neck passageways, said passageways being so cooperatively related to said valve that in one position of the latter said regulator is isolated completely from all fluid communication with said pipe line, and said automatic gas pressure regulator including a valve seat having screw threaded engagement with one of said structure sections thereby to be removable therefrom.

9. A composite automatic gas pressure regulator and manually operable regulator isolating valve, including in a unitary sectional structure, a three-position valve comprising one section of said structure equipped to be insertable detachably in a pipe line and having a neck portion with gas passageways opening therethrough, and an automatic gas pressure regulator comprising another section of said unitary structure equipped to be detachably mounted as a valve bonnet on said neck portion of said three-position valve having gas passageways registering with said neck passageways, said passageways being so cooperatively related to said valve that in one position of the latter said regulator is isolated completely from all fluid communication with said pipe line, and the said automatic gas pressure regulator including a pressure responsive valve located in one of said passageways including a flexible diaphragm and a movable valve member supported from and detachably connected to said diaphragm.

10. A composite automatic gas pressure regulator and manually operable regulator insolating valve, including in a unitary sectional structure, a three-position valve comprising one section of said structure equipped to be insertable detachably in a pipe line and having a neck portion with gas passageways opening therethrough, and an automatic gas pressure regulator comprising another section of said unitary structure equipped to be detachably mounted as a valve bonnet on said neck portion of said three-position valve having gas passageways registering with said neck passageways, said passageways being so cooperatively related to said valve that in one position of the latter said regulator is isolated completely from all fluid communication with said pipe line, and the said automatic gas pressure regulator including a pressure responsive valve located in one of said passageways having a flexible diaphragm, a valve member movable thereby, and screw threaded diaphragm clamping means securing said member to said diaphragm, both said member and said clamping means having accessible grippable portions enabling said diaphragm to be relieved of torque force when said screw means is turned and said valve member is held from turning by respectively separate wrenches.

11. A composite automatic gas pressure regulator and manually operable regulator isolating valve, including in a unitary sectional structure, a three-position valve comprising one section of said structure equipped to be insertable detachably in a pipe line and having a neck portion with gas passageways opening therethrough, and an automatic gas pressure regulator comprising another section of said unitary structure equipped to be detachably mounted as a valve bonnet on said neck portion of said three-position valve having gas passageways registering with said neck passageways, said passageways being so cooperatively related to said valve that in one position of the latter said regulator is isolated completely from all fluid communication with said pipe line, and the said automatic gas pressure regulator including a pressure responsive diaphragm, together with rigid means to clamp and stiffen a circular margin portion of said diaphragm, said clamping means being firmly but removably lodged between said structure sections.

12. A composite automatic gas pressure regulator and manually operable regulator isolating valve, including in a unitary section structure, a three-position valve comprising one section of said structure equipped to be insertable detachably in a pipe line and having a neck portion with gas passageways opening therethrough, and an automatic gas pressure regulator comprising another section of said unitary structure having fluid communication with said passageways and equipped to be detachably mounted as a valve bonnet on said neck portion of said three-position valve, said passageways being so cooperatively related to said valve that in one position of the latter said regulator is isolated completely from fluid communication with said pipe line, one of said structure sections having a tubular side wall, and said automatic gas pressure regulator including a pressure responsive diaphragm removably supported at the junction of said sections in a manner to be bordered and surrounded at its peripheral edge by said tubular side wall.

13. A fluid transitive appliance embodying a hollow structure having an inlet and an outlet adapted for connection of said structure as a unit in a pipe line, partitions in said structure dividing the hollow interior thereof into fluid conducting passageways leading from said inlet to said outlet and also affording a fluid utilizing chamber, and a single valve including a body portion of said hollow structure fitted for detachable connection to said chamber and a valve plug rotatably seated in said body portion containing movable ports shiftable into and out of three different communicating relationships to said passageways, one of said relationships passing fluid from said inlet through said chamber to said outlet, another of said relationships isolating said chamber from fluid communication with both said inlet and said outlet and simultaneously passing fluid directly from said inlet to said outlet, and another of said relationships isolating said chamber from fluid communication with both said inlet and said outlet and simultaneously isolating said inlet from said outlet.

14. A fluid transitive appliance embodying a hollow sectional structure comprising readily separable base and head sections, an inlet and outlet in said base section of said structure adapted for connection in a pipe line, partitions in said structure dividing the composite hollow interior thereof into optionally usable fluid conducting passageways one of which leads directly from said unit to said outlet, a fluid utilizing chamber in the other said passageway located in said head section, automatic fluid regulating devices in said chamber removable therewith from said base section and in part extending outside of said chamber and into one of said passageways in said base section, and a single valve within said base section including movable ports shiftable into and out of three different communcating relationships to said passageways, one of said relationships passing fluid from said inlet through said chamber to said outlet, another of said relationships isolating said pressure regulating devices from fluid communication with both said inlet and said outlet and simultaneously passing fluid directly from said inlet to said outlet, and another of said relationships isolating said pressure regulating devices from fluid communication with both said inlet and said outlet and simultaneously isolating said inlet from said outlet.

EDWARD NIEDERER, JR.
OTTO J. HEGEDUS.

REFERENCES CITED

The following references are of record in the file of this patent:

UNITED STATES PATENTS

| Number | Name | Date |
|---|---|---|
| 203,285 | Meredith | May 7, 1878 |
| 529,051 | Victor | Nov. 13, 1894 |
| 579,432 | Harrison | Mar. 23, 1897 |
| 2,147,850 | MacLean | Feb. 21, 1939 |

FOREIGN PATENTS

| Number | Country | Date |
|---|---|---|
| 12,942 | Great Britain | July 18, 1900 |